July 27, 1937. L. McCANDLESS 2,088,271
DEVICE FOR REDUCING INTERNAL METER FRICTION
Filed Sept. 13, 1934
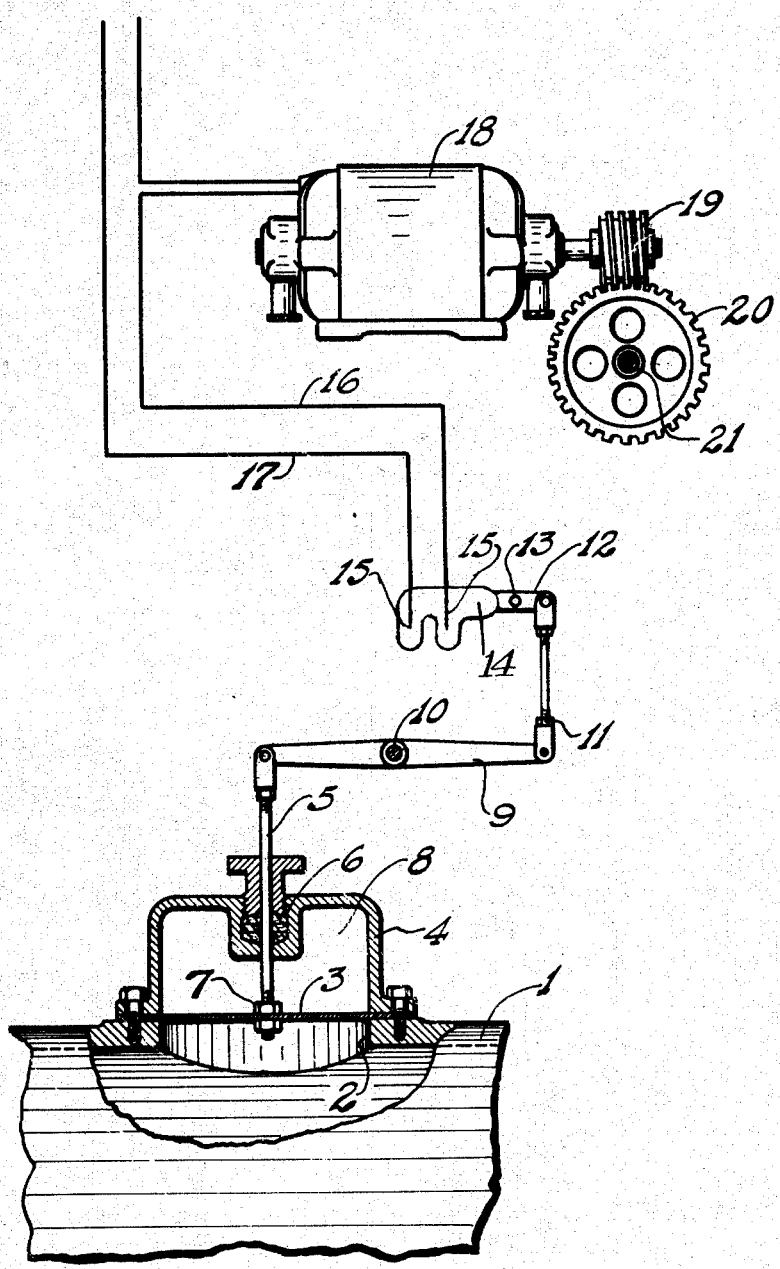
INVENTOR
Lyon McCandless
by William B Jaspert
Attorney.

Patented July 27, 1937

2,088,271

UNITED STATES PATENT OFFICE 2,088,271

DEVICE FOR REDUCING INTERNAL METER FRICTION

Lyon McCandless, Beaver Falls, Pa.

Application September 13, 1934, Serial No. 743,922

1 Claim. (Cl. 73—199)

This invention relates to new and useful improvements in liquid measuring devices more particularly to a device for reducing internal meter friction, and it is among the objects thereof to provide means for measuring liquids at low pressures or heads where the ordinary flow meter would be inefficient.

Another object of the invention is the provision of means for reducing internal friction in fluid meters, which consists of a device that can be utilized as an auxiliary with standard metering equipment.

In metering liquids as, for example, gasoline, delivered from tank wagons to filling station storage tanks, or the like, the metering equipment which is itself actuated by the flow of the fluid from the tank wagon will become more or less inefficient and ineffective when the head of the fluid in the tank drops to a minimum, there being insufficient force to overcome the internal friction of the meter which ordinarily employs piston elements for measuring the fluid by the displacement method.

To overcome the internal friction of meters so that they will operate effectively at minimum head pressures, it is proposed to utilize a motor drive which shall be coupled to the register drive shaft or other movable part of the meter and which shall be operative in response to pressure variations in the inlet and outlet meter flow passages.

The invention is more clearly illustrated in the accompanying drawing constituting a part hereof, in which like reference characters designate like parts, and in which the single figure is a view diagrammatically illustrating the invention as applied to a conventional flow meter.

With reference to the drawing, the reference numeral 1 designates a meter of the type which is operative by the head pressure of fluid being measured, the housing being provided with an opening 2 in which is disposed a pressure responsive diaphragm 3, the diaphragm being made of a flexible material to be responsive to pressure on both sides thereof.

A housing 4 is bolted on the meter housing 1 and is provided with a link 5 which extends through a packing gland 6 and is connected by screw nuts 7 to the diaphragm 3. The upper chamber of the housing 4 designated by the numeral 8 is connected to the inlet pressure of the meter and the lower face of the diaphragm is exposed to the outlet pressure of the meter so that the diaphragm 3 is actuated in opposite directions in accordance with the variations in pressure on either side thereof.

The link 5 is connected to a lever 9 fulcrumed at 10, and having a link 11 at its opposite end, the link being connected to a bar 12 fulcrumed at 13, on one end of which is mounted a mercury switch designated by the reference numeral 14.

In one direction of movement of the link 11, the mercury switch 14 will be tilted to the position where a pair of electrical terminals designated by the numeral 15 will be close circuited to energize a motor circuit designated by the numerals 16 and 17.

A motor 18 is connected in the circuit 16 and 17, and is provided with a worm 19 driving a gear wheel 20, the gear wheel being mounted on a shaft 21 which is the meter register drive shaft.

In operation, the switch is normally closed with pressure in the meter cavity on the upper side of diaphragm 3 since this cavity of the meter is under inlet pressure. In normal operation of a meter, the inlet pressure always exceeds the outlet pressure as the power consumed by the meter is represented by a pressure drop across the meter. If a control valve on the discharge side of the meter were closed then the inlet and outlet pressures would be equalized and the meter would not be operating.

By means of the tilting mercury switch or its equivalent, the switch is closed only when the inlet pressure or pressure on the upper side of the diaphragm exceeds the outlet pressure.

When switch 14 closes, the motor 18 is energized, and the motor drives the meter shaft 21. When the outlet pressure equals the inlet pressure, switch 14 opens. This occurs when the discharge valve is closed and the meter is not operating or when the motor is exerting sufficient power to correctly overcome the internal friction of the meter. In that case, the pressure drop across the meter disappears.

When the tank is drained dry, the inlet pressure drops to atmospheric and the meter stops. In a tank wagon, the inlet side of the diaphragm would be connected to a point in the supply line a few inches above the meter, but below the bottom of the tank. When the tank is drained to this point the motor would automatically shut off.

Although one embodiment of the invention has been herein illustrated and described, it will be obvious to those skilled in the art that various modifications may be made in the details of construction without departing from the principles herein set forth.

I claim:

A device for reducing internal meter friction comprising a meter having an opening, a flexible element constituting a closure for said opening, said meter having a cavity on one side of the flexible element communicating with the inlet of the meter, the other side of the flexible element communicating with the outlet of the meter, an electric motor connected to drive said meter, a control mechanism connected to and operative in response to movement of said flexible element for energizing and deenergizing said motor, said mechanism including an electric circuit and switch the latter being opened and closed by variations in pressures of the fluid acting upon said flexible element.

LYON McCANDLESS.